US007118042B2

(12) United States Patent
Moore et al.

(10) Patent No.: US 7,118,042 B2
(45) Date of Patent: Oct. 10, 2006

(54) METHOD AND APPARATUS FOR RAPID IMAGE CAPTURE IN AN IMAGE SYSTEM (75) Inventors: James W. Moore, Renton, WA (US); Danny S. Barnes, Maple Valley, WA (US); Matthew E. Allen, Maple Valley, WA (US)

(73) Assignee: Microscan Systems Incorporated, Renton, WA (US)

( * ) Notice: Subject to any disclaimer, the term of this patent is extended or adjusted under 35 U.S.C. 154(b) by 572 days.

(21) Appl. No.: 10/052,678

(22) Filed: Jan. 18, 2002

(65) Prior Publication Data
US 2003/0146285 A1 Aug. 7, 2003

(51) Int. Cl.
G06K 7/10 (2006.01)

(52) U.S. Cl. ............ 235/462.48; 235/462.01; 235/462.08; 235/462.32; 235/462.42; 235/375; 235/470; 382/101; 382/139; 382/140

(58) Field of Classification Search ........... 235/462.48, 235/383, 454, 462.1, 455, 375, 472.01, 385, 235/462.18, 462.45, 462.27, 462.25, 462, 235/462.32, 462.42, 470, 462.01, 462.08; 382/101, 139, 140; 350/435; 250/559.44
See application file for complete search history.

(56) References Cited

U.S. PATENT DOCUMENTS

| 4,516,265 | A | * | 5/1985 | Kizu et al. .................. 382/102 |
| 4,689,490 | A | * | 8/1987 | Thomas et al. ............. 235/462 |
| 5,258,605 | A | * | 11/1993 | Metlitsky et al. ....... 235/462.32 |
| 5,291,564 | A | * | 3/1994 | Shah et al. ................. 382/291 |
| 5,510,603 | A | * | 4/1996 | Hess et al. .................. 235/454 |
| 5,525,788 | A | * | 6/1996 | Bridgelall et al. ..... 235/462.08 |
| 5,768,023 | A | * | 6/1998 | Sawaki et al. .............. 359/622 |
| 5,770,841 | A | * | 6/1998 | Moed et al. ................ 235/375 |
| 5,773,808 | A | * | 6/1998 | Laser ..................... 235/462.42 |
| 5,880,451 | A | * | 3/1999 | Smith et al. .............. 235/462.1 |
| 5,923,017 | A | * | 7/1999 | Bjorner et al. .............. 235/385 |
| 5,962,838 | A | * | 10/1999 | Tamburrini ............ 235/462.45 |
| 6,073,849 | A | * | 6/2000 | Colley et al. .......... 235/462.27 |
| 6,236,735 | B1 | * | 5/2001 | Bjorner et al. .............. 382/101 |
| 6,267,293 | B1 | * | 7/2001 | Dwinell et al. ......... 235/462.12 |
| 6,499,662 | B1 | * | 12/2002 | Coleman et al. ....... 235/462.18 |
| 6,502,750 | B1 | * | 1/2003 | Barnes et al. .......... 235/462.01 |
| 6,505,778 | B1 | * | 1/2003 | Reddersen et al. .... 235/462.25 |
| 6,560,741 | B1 | * | 5/2003 | Gerety et al. ................ 714/752 |
| 2002/0148900 | A1 | * | 10/2002 | Gurevich et al. ...... 235/462.34 |

FOREIGN PATENT DOCUMENTS

EP 0 851 376 A1 7/1998

OTHER PUBLICATIONS

PCT International Search Report, Jun. 13, 2003.

* cited by examiner

*Primary Examiner*—Steven S. Paik
*Assistant Examiner*—Allyson N Trail
(74) *Attorney, Agent, or Firm*—Blakely Sokoloff Taylor & Zafman LLP (57) ABSTRACT

Embodiments of a method, apparatus, and article of manufacture for rapidly capturing images in an automated identification system to effectively extend one dimension of a field of view of an image system are disclosed herein. In one embodiment, the image system captures and processes multiple images of at least a portion of a surface of a component in the automated identification system in response to a trigger signal communicated from a triggering device configured to sense a location of the component. Various embodiments of the invention include multiple sources for capturing images, and/or multiple user-specified schemes for effectively extending the field of view of the image system along the axis of component travel in the automated identification system.

22 Claims, 6 Drawing Sheets

METHOD AND APPARATUS FOR RAPID IMAGE CAPTURE IN AN IMAGE SYSTEM

TECHNICAL FIELD OF THE INVENTION

This disclosure relates generally to an imaging system for reading and analyzing optically encoded symbols or images, and more particularly, but not exclusively, to a method, apparatus, and article of manufacture for rapidly capturing images in an image system to effectively extend a horizontal field of view and enhance image processing quality.

BACKGROUND INFORMATION

The automatic identification industry has improved the productivity and efficiency with which data may be collected in inventory control, product flow, quality control, purchasing, and other related business activities. One automated mechanism for collecting data is through the use of devices that read and decode bar codes, for example bar codes on product labels in retail applications.

A number of different bar code readers and laser scanning systems have been developed to read and interpret bar codes. In general, bar code scanners utilize a laser diode to produce a beam that is scanned across the bar code in a manner to enable reflections returned by the scanning beam to be analyzed and interpreted. However, as the need for greater information storage capacity has increased, traditional bar codes (e.g., a one-dimensional array of spaced lines of varying widths) are being replaced with symbol codes (e.g., two-dimensional bar codes or "matrix codes").

Symbol codes generally comprise multiple rows of lines and spaces stacked upon one another, and are generally capable of storing approximately 100 times more information in the same space occupied by a traditional one-dimensional bar code. Symbol code scanners typically consist of an imaging system including a charge coupled device ("CCD") that captures an image, stores the image in a memory, and then processes the image using software to convert the captured image into an output signal, which may be interpreted for a given application.

Some applications require reading images (i.e., symbol codes) at a relatively high speed as the image is presented to the reader via a conveyor belt, for example. These applications are prevalent in small package distribution, letter sorting, and in industrial and pharmaceutical manufacturing, for instance. When imaging at high speed, one problem typically encountered is the difficulty in maintaining image-processing quality. Image-processing quality is a measure of good and accurate reads of the target symbol codes. For example, in a high-speed conveyor belt application, a trigger (e.g., an optical sensor) may be used to indicate (e.g., based on timing or physical parameters), to the imaging system, the time to capture an image (i.e., the moment when the symbol code is within the field of view of the imaging system). If the imaging system is unable to capture a complete image of the target symbol code, the imaging system may inaccurately identify a component (to which the symbol code is affixed) as being unacceptably labeled, and cause the component to be removed from the line.

The image capture elements (e.g., a lens and CCD array) of an imaging system generally have only a limited field of view. As such, it is imperative that the target symbol code be positioned in a location, at the time of image capture, to enable a complete image of the symbol code to be captured for processing and interpretation in order to maintain high image-processing quality for a given application. Depending on the speed of the application, slight discrepancies in the speed of the conveyor belt, or the position of the symbol code on a component, for example, can greatly impact image-processing quality.

SUMMARY OF THE ILLUSTRATED EMBODIMENTS

An aspect of the illustrated embodiments is to provide a method, apparatus, and article of manufacture for rapidly capturing images in an automated identification system to effectively extend one dimension of a field of view of an image system. In one embodiment, the image system captures and processes multiple images of at least a portion of a surface of a component in the automated identification system in response to a trigger signal communicated from a triggering device configured to sense a location of the component. Various embodiments of the invention include multiple sources for capturing images, and/or multiple user-specified schemes for effectively extending the field of view of the image system along the axis of component travel in the automated identification system.

BRIEF DESCRIPTION OF THE VARIOUS VIEWS OF THE DRAWINGS

In the drawings, like reference numerals refer to like parts throughout the various views of the non-limiting and non-exhaustive embodiments of the present invention, and wherein.

DETAILED DESCRIPTION OF THE ILLUSTRATED EMBODIMENTS

Embodiments of a method, apparatus, and article of manufacture for rapid image capture in an image system are described in detail herein. In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, embodiments of the invention provide a method, apparatus, and article of manufacture for rapidly capturing multiple images in series via an image system to effectively increase one dimension of a field of view of the image system, and thereby increase image-processing quality in an automated identification system. In a representative embodiment in accordance with the teachings of the present invention, an image system, including an image sensor (e.g., a complimentary metal oxide semiconductor ("CMOS") image sensor), serially captures multiple (i.e., two or more) images in response to a trigger signal generated by a triggering device. In one embodiment, the triggering device may comprise an optical sensor that may generate the trigger signal in response to a location of a component on a conveyor belt, for example. The multiple captured images may be stored in a memory and then be processed to identify and read symbol codes (e.g., matrix codes) affixed to the component to aid in identification and/or tracking in various applications.

In other embodiments in accordance with the teachings of the present invention, the image system may be coupled to one or more additional sources (e.g., an external video camera) for capturing images of portions of the component. The image system may switch between the multiple sources, in an embodiment, based on user-specified criteria including parameters such as image-capture-quantity, time, or the like. In one instance, the image system may be coupled to a display to enable a user to view captured images in real-time and preliminarily assess the image-processing quality of the automated identification system. Other features of the illustrated embodiments will be apparent to the reader from the foregoing and the appended claims, and as the detailed description and discussion is read in conjunction with the accompanying drawings.

Figure 1:
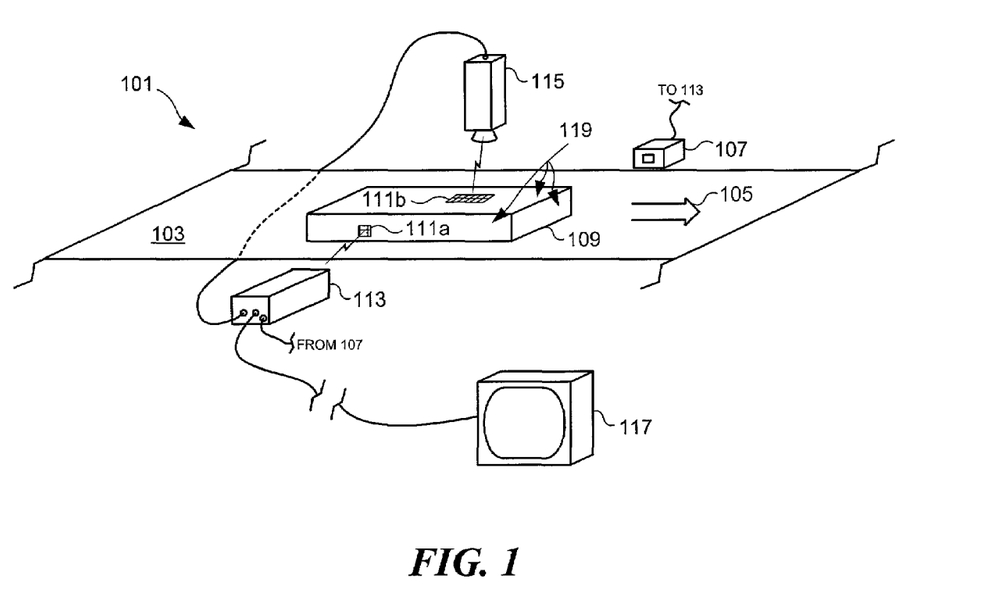
FIG. 1 is an illustration of an embodiment of an automated identification system including an image system in an example imaging application in accordance with the teachings of the present invention.

With reference now to the drawings, and in particular to FIG. 1, an embodiment of an automated identification system 101 is illustrated in accordance with the teachings of the present invention. In the illustrated embodiment, the automated identification system 101 includes an image system 113 coupled to an external camera 115 and a display 117. As a component 109 in the automated identification system 101 travels along a conveyer belt 103 in the direction of travel indicated by the arrow having reference numeral 105, a triggering device 107 senses the location of the component 109 on the conveyor belt 103, and communicates a trigger signal to the image system 113.

In one embodiment, the triggering device 107 may comprise an optical sensor which transmits and detects a reflected beam (not shown) for example, and which identifies the presence of an object (e.g., the component 109) at a location on the conveyor belt 103 via an interference with the reflected beam. In response to the trigger signal communicated from the triggering device 107, the image system 113 may capture multiple images of at least a portion of a surface 119 of the component 109. The multiple images may then be stored and processed to identify and read any symbol codes (e.g., symbol codes 111a and 111b) affixed to the surface 119 of the component 109 to enable tracking or identification of the component 109, and to ensure that acceptable identifying information has been affixed to the component 109 via a matrix code or the like, as desired by the user.

In various embodiments in accordance with the teachings of the present invention, the multiple images of the surface 119 of the component 109 may be captured via any one of a number of sources, such as an internal image sensor of the image system 113, as will be discussed in greater detail below, via the external camera 115, or via other sources coupled to the image system 113. In addition, a user may define one or more parameters to cause the image system 113 to switch between the various sources to capture images of different portions of the surface 119 of the component 109, in an embodiment. The one or more parameters may include for example, an image-capture-quantity parameter, which may be defined and activated by a user to cause the image system 113 to switch between sources following the capture of a defined number of images by any one source. Another of the one or more parameters may comprise a time parameter, which also may be defined and activated by the user to cause the image system 113 to switch between sources after a defined period of time has elapsed.

In other embodiments, the user may define an interval of time to elapse between each image capture, regardless of source, to adjust the effective field of view of the image system 113 in the automated identification system 101. In embodiments in accordance with the teachings of the present invention, the interval may comprise an identical period of time between pairs of successive image captures, or may vary with each successive pair of image captures. In one embodiment, the interval may be defined as zero to cause a continuous image capture limited only by the capture rate of the source.

As mentioned previously, in one embodiment the image system 113 may be coupled to a display 117 to enable generation of real-time visual renderings of the captured images. This video output feature may enable the user to quickly assess the image-processing quality of the automated identification system 101 by identifying whether the affixed symbol codes 111a and/or 111b are being captured in the multiple images.

Figure 2:
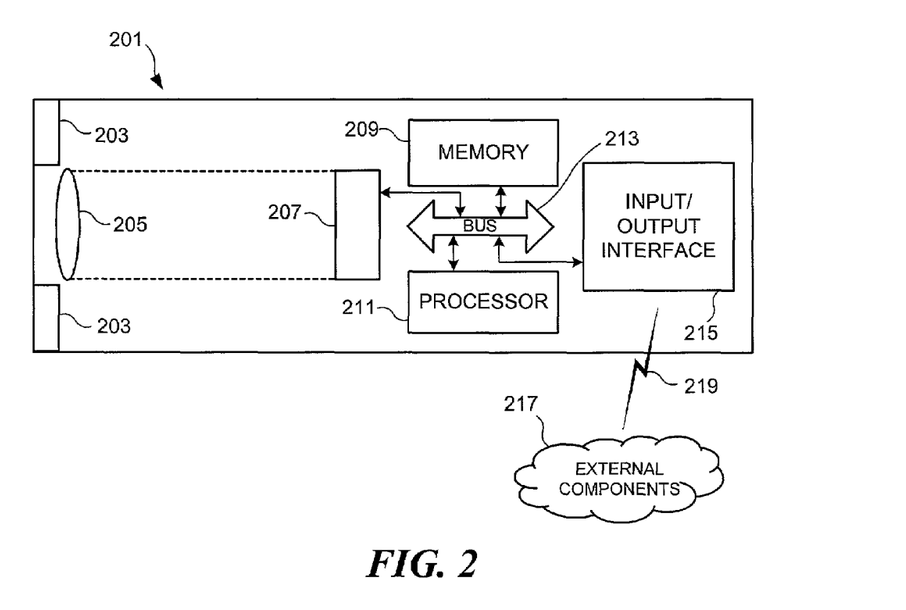
FIG. 2 is block diagram illustration of one embodiment of image system in accordance with the teachings of the present invention.

With reference now primarily to FIG. 2, a block diagram illustrating one embodiment of an apparatus 201 that may be used for the image system 113 is shown in accordance with the teachings of the present invention. In the illustrated embodiment, the apparatus 201 includes an illumination element 203, which may comprise a plurality of light emitting diodes ("LED"), or the like, to illuminate the surface 119 of the component 109 (see, e.g., FIG. 1) to enable images to be captured. The apparatus 201 also includes a lens 205 for collecting and focusing light onto an internal image sensor 207, which may comprise a CCD, a CMOS image sensor, or other suitable device, in various embodiments.

The image sensor 207 may be coupled to a bus 213 to enable communication with other elements of the apparatus 201. A memory 209 and a processor 211 may also be coupled to the bus 213, in an embodiment. The processor 211 may be a suitable commercially available processor, digital signal processor ("DSP"), or the like. The memory 209 may be a machine-readable medium such as dynamic random access memory ("DRAM"), and may include static random access memory ("SRAM") or other types of suitable memory devices. In one embodiment, the memory 209 may also include machine-readable media such as for example, but not limited to, a magnetic hard disk, a floppy disk, an optical disk, a read-only memory component ("ROM"), a smart card, or another form of storage for data. In one embodiment, the memory 209 may include removable media, read-only memory, readable/writable memory, or the like. For the purpose of the specification, the term "machine-readable medium" shall be taken to include any medium that is capable of storing data, information, or encoding a sequence of instructions or operations for execution by the processor 211 to cause the processor 211 to perform the methodologies of the present invention. The term "machine-readable medium" shall be understood to include, for example, solid-state memories; ROM; random access memory ("RAM"); magnetic disk storage media; optical storage media; flash memory devices; electrical, optical, acoustical or other form of propagated signals (e.g., carrier tones, infrared signals, and digital signals); and the like.

In one embodiment, the apparatus 201 may interface to external components 217, such as for example but not limited to, the triggering device 107, the external camera 115, and/or the display 117, through an input/output interface 215. The input/output interface 215 may include a transceiver compatible with analog and/or digital signals in any one of a variety of formats. For example, the external camera 115 may transmit an analog serial communication such as RS-170 (Recommended Standard 170), which may then be converted by an analog-to-digital converter (not shown) for processing by the processor 211. In one embodiment, a carrier wave signal 219 may be received/transmitted by the input/output interface 215 to communicate with an external component 217. In one embodiment, the carrier wave signal 219 is considered to be machine-readable media, and may be transmitted through wires, cables, optical fibers, or through free-space, or the like.

Figure 3:
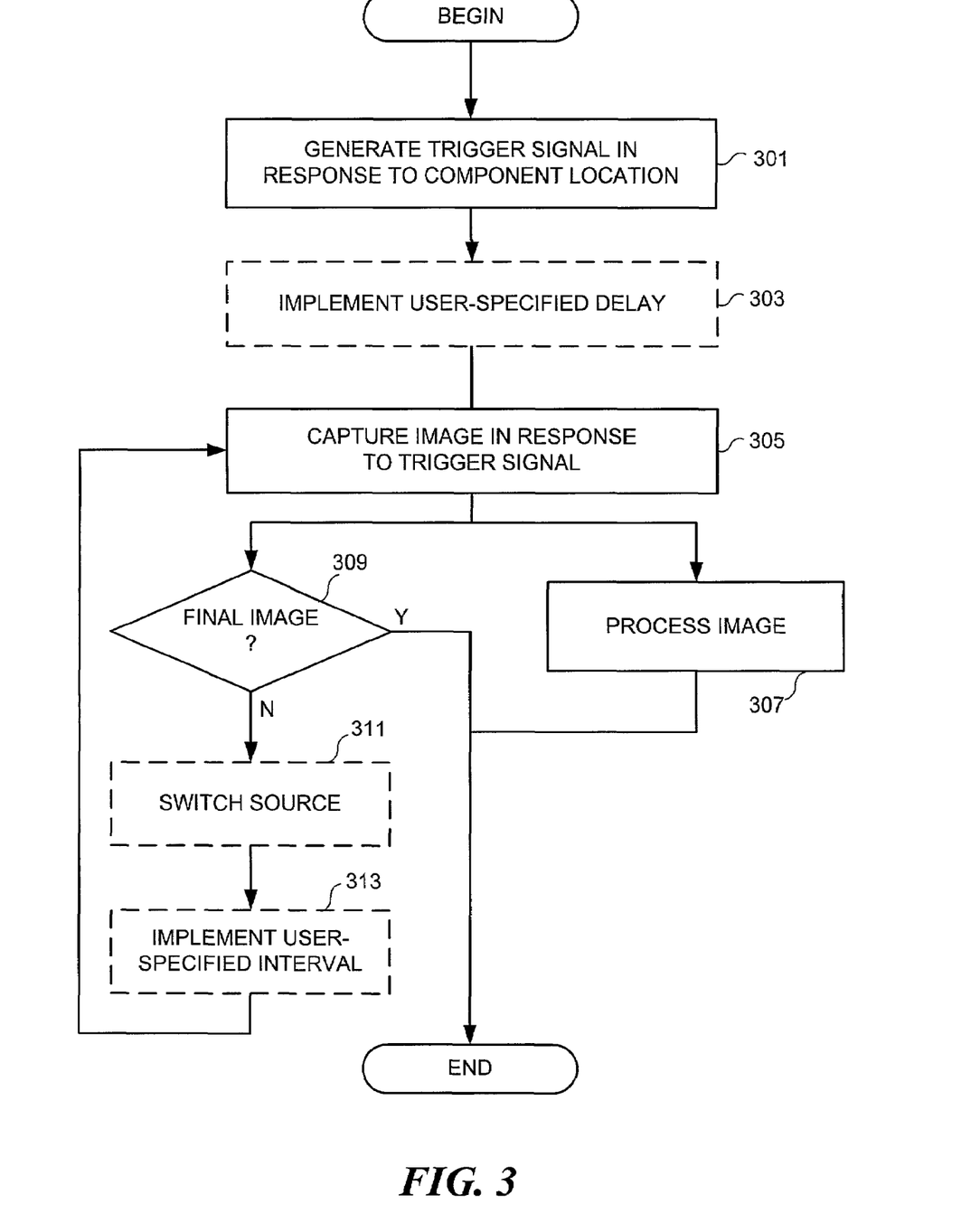
FIG. 3 is a flow diagram illustrating an embodiment of a flow of events in accordance with the teachings of the present invention.

With reference now primarily to FIG. 3, an embodiment of a flow of events in the automated identification system 101 (see, e.g., FIG. 1) is shown in accordance with the teachings of the present invention. As mentioned previously, as a component (e.g., the component 109, FIG. 1) travels through the automated identification system 101, a triggering device (e.g., the triggering device 107, FIG. 1) may generate a trigger signal in response to a location of the component 109 (see, e.g., process block 301).

The image system 113 may then receive the trigger signal from the triggering device 107 and implement, via software for example, a user-specified delay, if any (see, e.g., process block 303) prior to capturing a first image in response to the trigger signal (see, e.g., process block 305). It will be noted that process block 303, as well as process blocks 311 and 313, shown in FIG. 3, are illustrated with broken lines to indicate that they may or may not occur in various embodiments in accordance with the teachings of the present invention. Following any user-specified delay, the first image is captured (see, e.g., block 305), transferred to a memory (e.g., the memory 209, FIG. 2), and processed (see, e.g., process block 307) to identify and read any symbol codes (e.g., symbol codes 111*a* and 111*b*, FIG. 1), or a portion of any symbol codes, that have been captured within the first image.

Concurrently with the processing of the captured image (see, e.g., block 307), a determination may be made (see, e.g., process block 309) as to whether an additional image is also to be captured (i.e., according to a user-specified protocol). If an additional image is to be captured (see, e.g., block 309), the process may enter an iterative loop beginning again at process block 305 with the capture of at least one subsequent image. Each subsequently captured image may then be stored in the memory 209, for example, and processed (see, e.g., block 307) in a manner similar to the first image. It will be appreciated that a symbol code (e.g., the symbol codes 111*a* and 111*b*, FIG. 1) may be contained within one, or a combination of two or more, of the multiple images captured in accordance with the teachings of the present invention. In embodiments in which a symbol code is partially captured in two or more successive images, processing the multiple images to identify and read the symbol code may include reconstruction or "stitching" of the symbol code to form a whole unit equivalent to capturing the entire symbol code in a single one of the multiple images. In various embodiments in accordance with the teachings of the present invention, the source for the next successive image capture may be switched (e.g., between the internal image sensor 207 of the image system/apparatus 113/201, and the external camera 15) (see, e.g., process block 311), and/or a user-specified interval may be implemented (see, e.g., process block 313) before the next successive image capture, as will be discussed hereinafter. The switching of the source for the image capture (see, e.g., block 311), and/or the implementation of the user-specified interval (see, e.g., block 313) creates a potential for a wide range of possible image capture scenarios, such as those illustrated in FIGS. 4–12, and discussed below.

Figure 4:
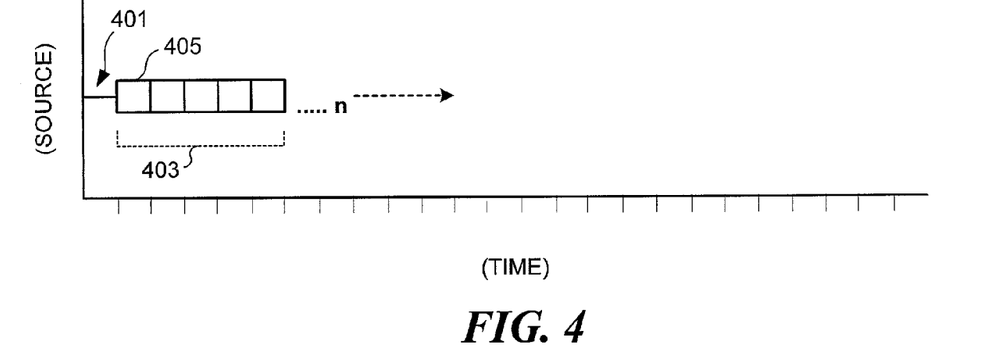
FIGS. 4–6 are illustrations of example event timelines showing a series of image captures via a single source in accordance with the teachings of the present invention.
Figure 5:
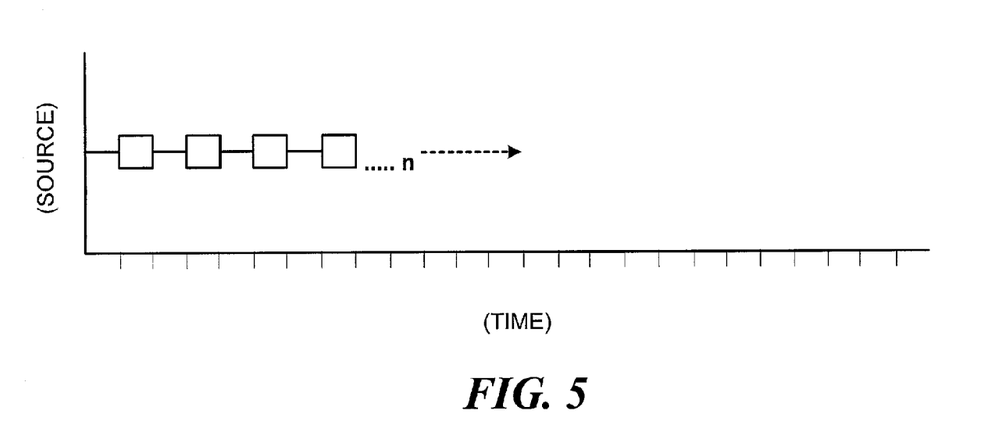
Figure 6:
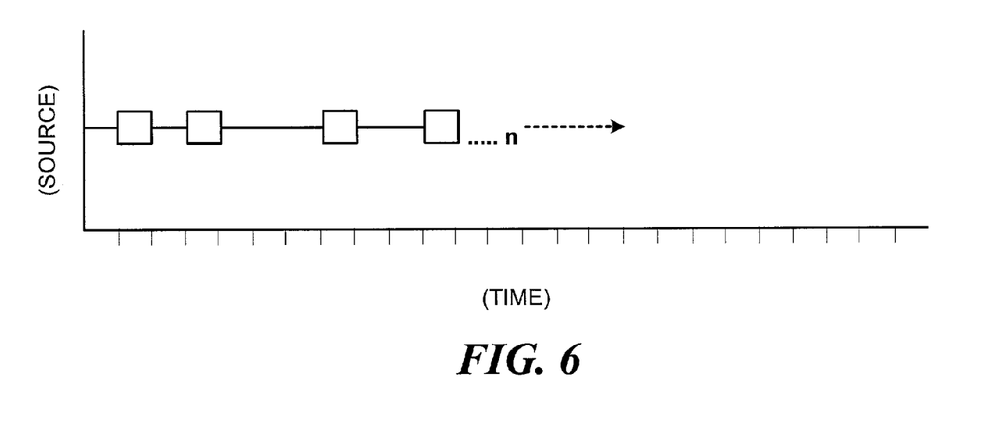

For example, FIGS. 4–6 illustrate example event timelines showing a series of image captures 403 via a single source (e.g., the internal image sensor 207, FIG. 2 of the image system 113, FIG. 1) in accordance with the teachings of the present invention. In the embodiments illustrated in FIGS. 4–6, each of the first image captures 405 in the series of image captures 403 is preceded by a user-specified delay 401 (see, e.g., process block 303, FIG. 3). It will be appreciated that in other embodiments the delay 401 may not be implemented, and the first image capture may immediately follow receipt and processing of the trigger signal by the image system 113 (see, e.g., FIG. 1).

FIG. 4 illustrates a scenario in which multiple images are captured in series via a single source without implementing a user-specified interval (or implementing a user-specified interval having a duration equal to zero). FIG. 5 illustrates a scenario in which multiple images are captured in series via a single source while implementing a user-specified interval between successive image captures in which each interval has a duration that is identical to each other interval in the series. FIG. 6 illustrates a scenario in which multiple images are captured in series via a single source while implementing a user-specified interval between successive image captures in which each interval has a duration that is distinct from each other interval in the series. It will be noted that the distinct interval durations illustrated in FIG. 6 does not preclude an embodiment in which two or more, but not all, of the intervals have an equal duration.

Similarly, FIGS. 7–12 illustrate example event timelines showing a series of image captures via multiple sources (e.g., the internal image sensor 207, FIG. 2, and the external camera 115, FIG. 1). In one embodiment, the capture of multiple images via multiple sources includes configuring the image system 113 to receive an input from an external component, such as the external camera 115, via switching between available sources in response to user-specified criteria. In various embodiments in accordance with the teachings of the present invention, the user-specified criteria may include an image-capture-quantity parameter, a time parameter, or the like.

Figure 7:
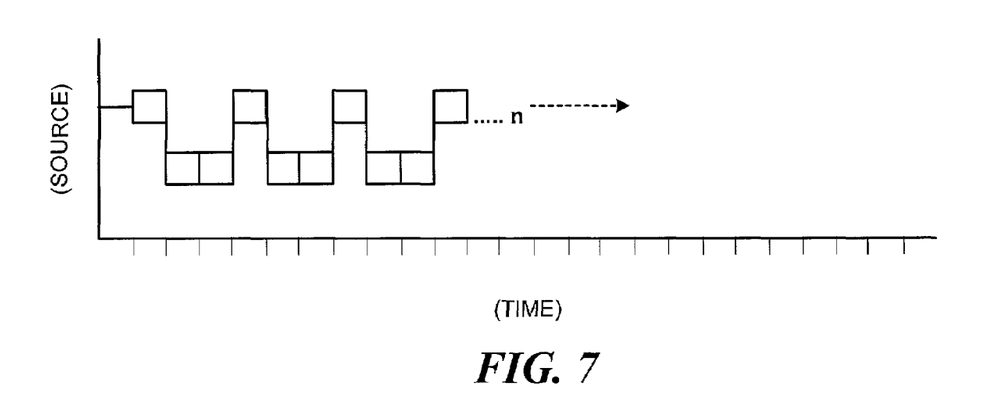
FIGS. 7–9 are illustrations of example event timelines showing a series of image captures via multiple sources wherein switching between the multiple sources occurs in response to a user-specified image-capture-quantity parameter in accordance with the teachings of the present invention.
Figure 8:
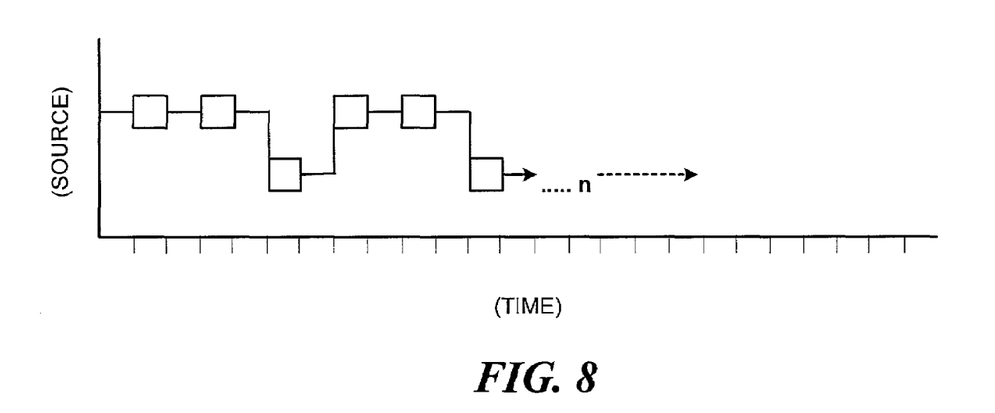
Figure 9:
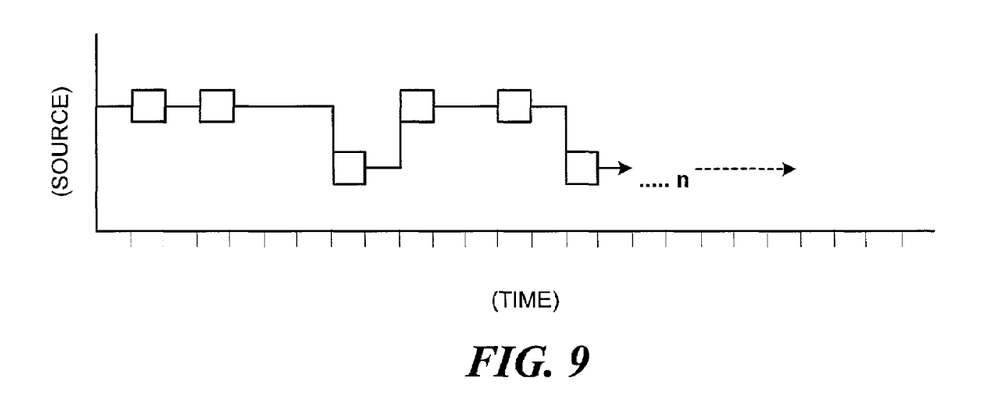

FIGS. 7–9 illustrate example event timelines showing a series of image captures via multiple sources wherein switching between the multiple sources comprises a response to the user-specified image-capture-quantity parameter. For example, in the embodiment illustrated in FIG. 7, a first source (e.g., the internal image sensor 207 of the apparatus 201, FIG. 2) may correspond to an image-capture-quantity parameter equal to one, while a second source (e.g., the external camera 115, FIG. 1) may correspond to an image-capture-quantity parameter equal to two. With regard to the foregoing defined parameters, the image system 113 (see, e.g., FIG. 1) will switch from the first source following capture of a single image, and then switch from the second source following capture of two subsequent images, and so on.

In a similar manner, FIG. 8 illustrates an embodiment of a series of image captures in which the first source corresponds to an image-capture-quantity parameter equal to two, and the second source corresponds to an image-capture-quantity parameter equal to one. In addition, an identical user-specified interval is defined to precede each successive image capture, as described above in conjunction with FIG. 5, regardless of source. FIG. 9 illustrates yet another embodiment of a series of image captures in which the first source corresponds to an image-capture-quantity parameter equal to two, the second source corresponds to an image-capture-quantity parameter equal to one, and a distinct user-specified interval is defined to precede each successive image capture, regardless of source.

Figure 10:
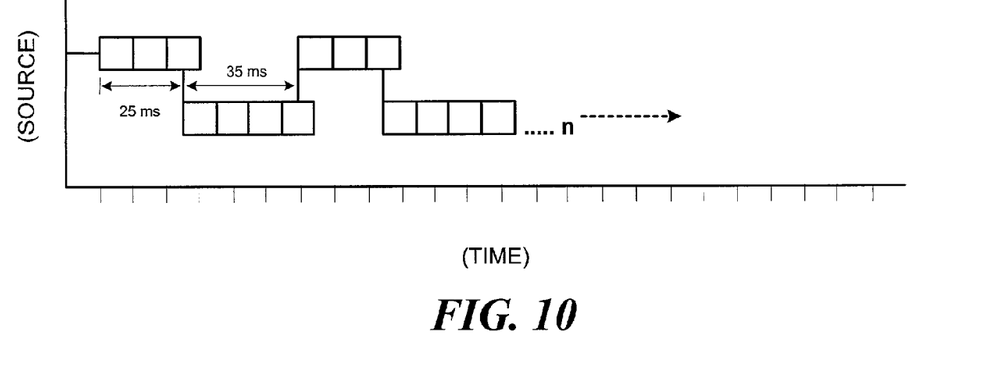
FIGS. 10–12 are illustrations of example event timelines showing a series of image captures via multiple sources wherein switching between the multiple sources occurs in response to a user-specified time parameter in accordance with the teachings of the present invention.
Figure 11:
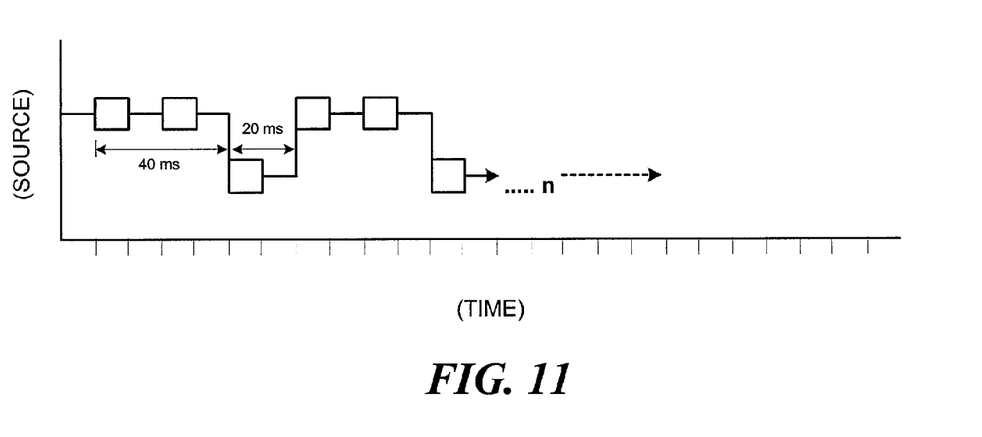
Figure 12:
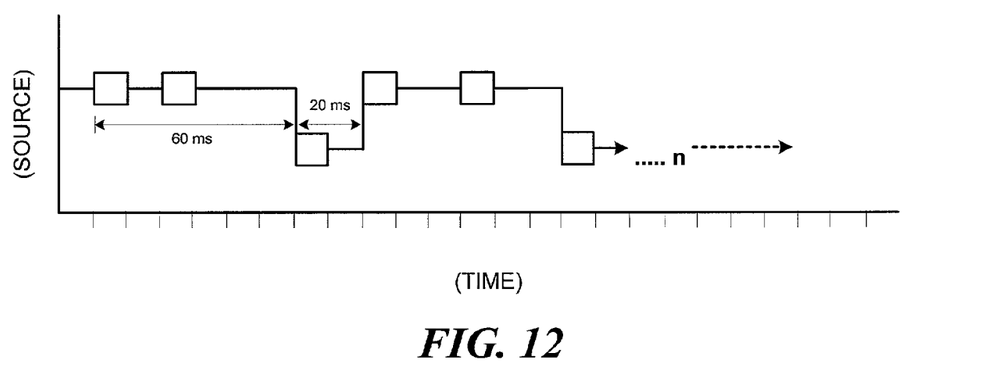

FIGS. 10–12 are illustrations of example event timelines showing a series of image captures via multiple sources wherein switching between the multiple sources comprises a response to a user-specified time parameter in accordance with the teachings of the present invention. For example, in the embodiment illustrated in FIG. 10, a first source may correspond to a time parameter equal to 25 milliseconds ("ms"), while a second source may correspond to a time parameter equal to 35 ms. The image system (e.g., the image system 113, FIG. 1) may switch from the first source or from the second source after the time defined by the corresponding time parameter has elapsed. It will be appreciated that in one embodiment, the switch between the multiple sources may occur during an image capture, as illustrated in FIG. 10. It will also be appreciated that the specific time periods used herein in conjunction with FIGS. 10–12 are intended only as example, and should not be construed to limit the scope of the present invention. For example, in another embodiment in accordance with the teachings of the present invention, the time parameter corresponding to the multiple sources may be in a range of from about 100 ms to about 200 ms.

In a similar manner, FIG. 11 illustrates an embodiment of a series of image captures in which the first source may correspond to a time parameter equal to 40 ms, while the second source may correspond to a time parameter equal to 20 ms. In addition, an identical user-specified interval is defined to precede each successive image capture, as described above in conjunction with FIG. 5, regardless of source. FIG. 12 illustrates yet another embodiment of a series of image captures in which the first source corresponds to a time parameter equal to 60 ms, the second source corresponds to a time parameter equal to 20 ms, and a distinct user-specified interval is defined to precede each successive image capture, regardless of source.

Figure 14:
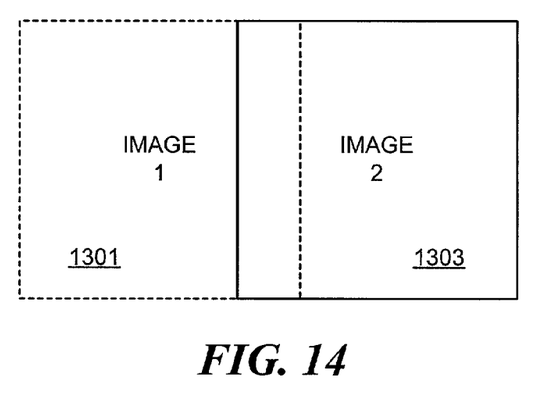
FIG. 14 is a pictorial illustration of the pair of example images of FIG. 13 overlapping to effectively extend a field of view in accordance with the teachings of the present invention.
Figure 15:
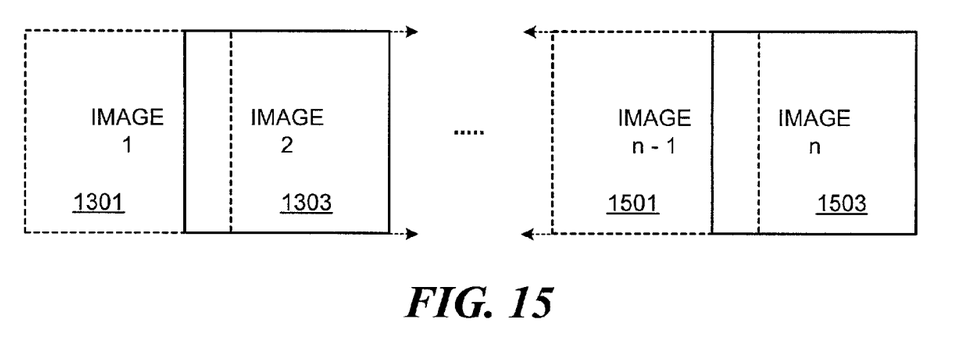
FIG. 15 is a pictorial illustration of a plurality of example images, including the pair of example images of FIG. 13, overlapping to effectively extend the field of view in accordance with the teachings of the present invention.

It will be appreciated that the number of image captures in a series corresponding to any one trigger signal may vary in different embodiments in accordance with the teachings of the present invention. For example, in one embodiment, a series of multiple images may include the capture of a total of ten images via one or more sources. It will be appreciated that there is an inherent limitation in the number of images that may be captured in conjunction with any given trigger signal, assuming that the component (e.g., the component 109, FIG. 1) is moving through the automated identification system 101 (see, e.g., FIG. 1). By capturing a greater number of images, the effective field of view of the image system 113 may be extended to aid in the successful identification and reading of any symbol codes (e.g., the symbol codes 111a and 111b, FIG. 1) affixed to the surface 119 of the component 109 in the automated identification system 101. For example, FIGS. 13–15 are pictorial illustrations of representative captured images, and demonstrate the relationship among multiple images that may be obtained from a single source via methodologies of the present invention.

Figure 13:
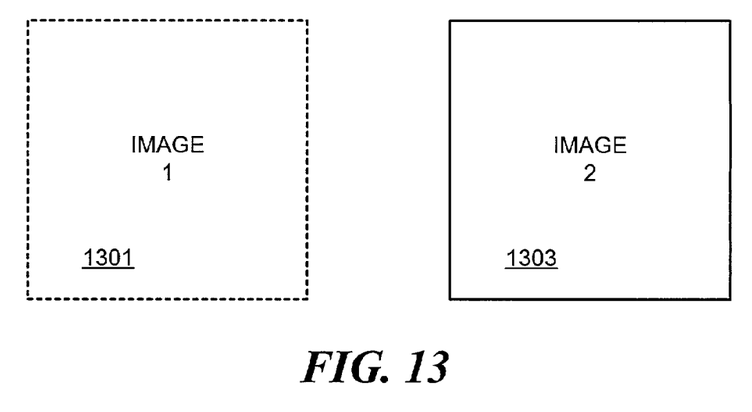
FIG. 13 is a pictorial illustration of a pair of example images in accordance with the teachings of the present invention.

FIG. 13 shows a pair of captured images 1301 and 1303 that may represent completely distinct portions of the surface 119 of the component 109 moving through the automated identification system 101 (see, e.g., FIG. 1). The captured images 1301 and 1303 may be completely distinct either because of the duration of the user-specified interval implemented between the successive images 1301 and 1303, as discussed above, or based on the speed of the conveyor belt 103 (see, e.g., FIG. 1), or the like, or a combination of such factors. In any event, consideration of the speed at which components are moving through the automated identification system 101 (FIG. 1) and/or the user-specified interval between successive image captures, enables the user to capture slightly overlapping images, such as those illustrated in FIG. 14. Overlapping the image captures increases image-processing quality by helping to ensure that any symbol codes (e.g., the symbol codes 111a and 111b, FIG. 1) affixed to the surface 119 of the component 109 (FIG. 1) will be captured in an image to permit processing and accurate identification and reading thereof. This enables the user of the automated identification system 101 (FIG. 1) to rely less on the setup of the image system in relation to the position of the triggering device, and/or timing issues related to the speed of the components (e.g., the component 109) to accurately identify and read symbol codes (e.g., the symbol codes 111a and 111b, FIG. 1).

It will be appreciated that any number of images may be linked together in the manner described above to further increase the effective field of view of the image system (e.g., the image system 113, FIG. 1) without the necessity to alter any optics associated with the image system 113. For example, FIG. 15 is a pictorial illustration showing a plurality of example images in which captured images 1301 and 1303 are shown in conjunction with two additional images 1501 and 1503, representing the "n-1"th and "n"th images in the overlapping series. It will be appreciated however, that because each captured image will also require processing, extending the effective field of view too far beyond a range necessary to maximize image-processing quality, creates an inefficiency in the processing of the captured images for identification and reading purposes, thereby reducing the benefits associated with methodologies in accordance with the teachings of the present invention.

It will further be appreciated that the image capture sources such as the image system 113 itself and/or the external camera 115 may be configured to capture images in either an analog or a digital format, depending on the particular components used in an application. As mentioned previously, where an analog signal is generated to represent the captured image, an analog-to-digital converter and/or a frame grabber component may be used to condition the signal for processing via a DSP or the like.

In one embodiment, user-specified preferences, such as the delay, the interval, and/or the switching criteria described above, may be administered via a graphical user-interface, or the like, via a computer or other user device.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. An article of manufacture comprising:
   a machine-readable medium that provides instructions, including instructions to:
      process a single received trigger signal communicated from a triggering device in response to a location of a component in an automated identification system;
      capture multiple images of at least a portion of a surface of the component in response to the received trigger signal, the multiple images comprising a series of images including a first two-dimensional image and at least one subsequent two-dimensional image, wherein the instructions to capture multiple images include instructions to switch between two or more sources configured to capture the multiple images, including instructions to switch from one source to another source in response to an occurrence of user-specified criteria that includes an image-capture-quantity parameter;
      store the multiple images in a memory; and
      process the multiple images to identify and read a symbol code, if any, contained within at least one or a combination of two or more of the multiple images.

2. The article of manufacture of claim 1 wherein the instructions to capture multiple images include instructions to implement a user-specified delay prior to capture of the first two-dimensional image, the user-specified delay having a defined duration.

3. The article of manufacture of claim 2 wherein the defined duration equals zero.

4. The article of manufacture of claim 1 wherein the instructions to capture multiple images include instructions to implement a user-specified interval following each image capture in the series of images, the user-specified interval having a defined duration.

5. The article of manufacture of claim 4 wherein the defined duration equals zero.

6. The article of manufacture of claim 4 wherein the defined duration of each user-specified interval is identical.

7. The article of manufacture of claim 4 wherein the defined duration of each user-specified interval is distinct.

8. An article of manufacture comprising:
   a machine-readable medium that provides instructions, including instructions to:
      process a single received trigger signal communicated from a triggering device in response to a location of a component in an automated identification system;
      capture multiple images of at least a portion of a surface of the component in response to the received trigger signal, the multiple images comprising a series of images including a first two-dimensional image and at least one subsequent two-dimensional image, wherein the instructions to capture multiple images include instructions to switch between two or more sources configured to capture the multiple images, including instructions to switch from one source to another source in response to an occurrence of user-specified criteria that includes a time parameter;
      store the multiple images in a memory; and
      process the multiple images to identify and read a symbol code, if any, contained within at least one or a combination of two or more of the multiple images.

9. The article of manufacture of claim 8 wherein the instructions to capture multiple images include instructions to implement a user-specified delay prior to capture of the first two-dimensional image, the user-specified delay having a defined duration.

10. The article of manufacture of claim 9 wherein the defined duration equals zero.

11. The article of manufacture of claim 8 wherein the instructions to capture multiple images include instructions to implement a user-specified interval following each image capture in the series of images, the user-specified interval having a defined duration.

12. The article of manufacture of claim 11 wherein the defined duration equals zero.

13. The article of manufacture of claim 11 wherein the defined duration of each user-specified interval is identical.

14. The article of manufacture of claim 11 wherein the defined duration of each user-specified interval is distinct.

15. A method comprising:
    receiving a single trigger signal communicated from a triggering device in response to a location of a component in an automated identification system;
    capturing multiple images of at least a portion of a surface of the component in response to the trigger signal, the multiple images comprising a series of images including a first two-dimensional image and at least one subsequent two-dimensional image, wherein capturing the multiple images comprises capturing at least one of the multiple images via an external camera coupled to the image system and wherein capturing at least one of the multiple images via an external camera includes configuring the image system to receive an input from the external camera by switching to the external camera in response to user-specified criteria that includes an image-capture-quantity parameter; and
    processing the multiple images to identify and read a symbol code, if any, contained within at least one or a combination of two or more of the multiple images.

16. The method of claim 15 wherein capturing at least one of the multiple images via an external camera further includes configuring the image system to receive an input from an internal image sensor via switching to the internal image sensor in response to the user-specified criteria.

17. A method comprising:
receiving a single trigger signal communicated from a triggering device in response to a location of a component in an automated identification system;
capturing multiple images of at least a portion of a surface of the component in response to the trigger signal, the multiple images comprising a series of images including a first two-dimensional image and at least one subsequent two-dimensional image, wherein capturing the multiple images comprises capturing at least one of the multiple images via an external camera coupled to the image system and wherein capturing at least one of the multiple images via an external camera includes configuring the image system to receive an input from the external camera by switching to the external camera in response to user-specified criteria that includes a time parameter; and
processing the multiple images to identify and read a symbol code, if any, contained within at least one or a combination of two or more of the multiple images.

18. The method of claim 17 wherein capturing at least one of the multiple images via an external camera further includes configuring the image system to receive an input from an internal image sensor via switching to the internal image sensor in response to the user-specified criteria.

19. A method comprising:
receiving a single trigger signal communicated from a triggering device in response to a location of a component in an automated identification system;
capturing multiple two-dimensional images of at least a portion of a surface of the component in response to the trigger signal, the multiple two-dimensional images comprising a series of images including a first image and at least one subsequent image, wherein capturing the multiple two-dimensional images comprises capturing at least one of the multiple two-dimensional images via an external camera coupled to the image system and wherein capturing at least one of the multiple two-dimensional images via an external camera includes configuring the image system to receive an input from the external camera by switching to the external camera in response to user-specified criteria that includes an image-capture-quantity parameter; and
processing the multiple two-dimensional images to identify and read a symbol code, if any, contained within at least one or a combination of two or more of the multiple two-dimensional images.

20. The method of claim 19 wherein capturing at least one of the multiple two-dimensional images via an external camera further includes configuring the image system to receive an input from an internal image sensor via switching to the internal image sensor in response to the user-specified criteria.

21. A method comprising:
receiving a single trigger signal communicated from a triggering device in response to a location of a component in an automated identification system;
capturing multiple two-dimensional images of at least a portion of a surface of the component in response to the trigger signal, the multiple two-dimensional images comprising a series of images including a first image and at least one subsequent image, wherein capturing the multiple two-dimensional images comprises capturing at least one of the multiple two-dimensional images via an external camera coupled to the image system and wherein capturing at least one of the multiple two-dimensional images via an external camera includes configuring the image system to receive an input from the external camera by switching to the external camera in response to user-specified criteria that includes a time parameter; and
processing the multiple two-dimensional images to identify and read a symbol code, if any, contained within at least one or a combination of two or more of the multiple two-dimensional images.

22. The method of claim 21 wherein capturing at least one of the multiple two-dimensional images via an external camera further includes configuring the image system to receive an input from an internal image sensor via switching to the internal image sensor in response to the user-specified criteria.

* * * * *